United States Patent
Kaplan et al.

(10) Patent No.: US 12,225,118 B2
(45) Date of Patent: Feb. 11, 2025

(54) METHOD FOR SECURELY TRANSMITTING SEQUENCES OF QUANTUM STATES BETWEEN A PLURALITY OF ONLINE PARTICIPANTS OVER A QUANTUM COMMUNICATION CHANNEL

(71) Applicant: VERIQLOUD, Montrouge (FR)

(72) Inventors: Marc Kaplan, Montrouge (FR); George Harder, Paris (FR)

(73) Assignee: VERIQLOUD, Montrouge (FR)

( * ) Notice: Subject to any disclaimer, the term of this patent is extended or adjusted under 35 U.S.C. 154(b) by 326 days.

(21) Appl. No.: 17/640,763

(22) PCT Filed: Sep. 3, 2020

(86) PCT No.: PCT/EP2020/074576
§ 371 (c)(1),
(2) Date: Mar. 4, 2022

(87) PCT Pub. No.: WO2021/043891
PCT Pub. Date: Mar. 11, 2021

(65) Prior Publication Data
US 2022/0311604 A1    Sep. 29, 2022

(30) Foreign Application Priority Data

Sep. 6, 2019    (FR) ..................... 1909839

(51) Int. Cl.
*H04L 9/08*    (2006.01)
(52) U.S. Cl.
CPC .......... *H04L 9/0858* (2013.01); *H04L 9/0855* (2013.01)

(58) Field of Classification Search
CPC ............................. H04L 9/085; H04L 9/0855
See application file for complete search history.

(56) References Cited

U.S. PATENT DOCUMENTS

| | | | | |
|---|---|---|---|---|
| 5,764,765 A * | 6/1998 | Phoenix | ............... | H04L 9/0858 380/256 |
| 7,403,623 B2 * | 7/2008 | Cerf | ..................... | H04L 9/0858 380/278 |
| 7,460,670 B1 * | 12/2008 | Elliott | .................. | H04L 9/0858 709/224 |
| 7,515,716 B1 * | 4/2009 | Elliott | .................. | H04L 9/0858 380/278 |

(Continued)

FOREIGN PATENT DOCUMENTS

WO    2021043891 A1    3/2021

OTHER PUBLICATIONS

Foreign Communication from a Related Counterpart Application, International Search Report dated Nov. 18, 2020, International Application No. PCT/EP2020/074576 filed on Sep. 3, 2020.

(Continued)

*Primary Examiner* — Matthew Smithers
(74) *Attorney, Agent, or Firm* — Conley Rose, P.C.

(57) ABSTRACT

The present application relates to a method for securely transmitting a sequence of quantum states between a first participant $C_i$ and a second participant $C_j$ among a plurality of N participants, and to a device implementing said secure transmission method.

13 Claims, 3 Drawing Sheets

(56) References Cited

U.S. PATENT DOCUMENTS

| | | | | |
|---|---|---|---|---|
| 8,135,276 | B2* | 3/2012 | Munro | H04B 10/291 398/40 |
| 9,473,301 | B2* | 10/2016 | Englund | H04J 14/02 |
| 11,223,424 | B2* | 1/2022 | Bitauld | H04B 10/548 |
| 2002/0097874 | A1* | 7/2002 | Foden | H04L 9/0858 380/256 |
| 2002/0196827 | A1* | 12/2002 | Shields | H01S 5/10 257/14 |
| 2004/0105087 | A1* | 6/2004 | Gogolla | G01S 17/36 356/3 |
| 2007/0025551 | A1* | 2/2007 | Harrison | H04B 10/1143 380/256 |
| 2007/0076883 | A1 | 4/2007 | Kuang | |
| 2007/0098174 | A1* | 5/2007 | Trifonov | H04L 9/0852 380/256 |
| 2007/0130455 | A1* | 6/2007 | Elliott | H04L 9/0858 713/150 |
| 2012/0148237 | A1* | 6/2012 | Harrison | B82Y 10/00 398/180 |
| 2013/0016835 | A1* | 1/2013 | Zbinden | H04B 10/70 380/255 |
| 2017/0163415 | A1* | 6/2017 | Gray | H04B 10/516 |
| 2019/0074997 | A1* | 3/2019 | Shin | H04L 25/0272 |
| 2019/0190706 | A1* | 6/2019 | Stack | H04L 9/0858 |
| 2020/0050959 | A1* | 2/2020 | Ashrafi | H04L 9/0852 |
| 2020/0099320 | A1* | 3/2020 | Umemoto | A61B 1/00148 |
| 2020/0382219 | A1* | 12/2020 | Innes | H04W 12/04 |
| 2022/0045770 | A1* | 2/2022 | Fu | H04B 10/0795 |
| 2022/0399145 | A1* | 12/2022 | Kirichenko | G06N 10/40 |

OTHER PUBLICATIONS

Foreign Communication from a Related Counterpart Application, Written Opinion dated Nov. 18, 2020, International Application No. PCT/EP2020/074576 filed on Sep. 3, 2020.

A. R. Dixon et al: "Quantum key distribution with hacking countermeasures and long term field trial", Scientific Reports, vol. 7, No. 1. May 16, 2017, XP055707051, Doi: 10.1038/s41598-017-01884-0.

Islam et al., "Provably Secure and High-Rate Quantum Key Distribution with Time-Bin Qubits" (Sci. Adv. 2017 ;3) arXiv: 1709.06135v1 [quant-ph] Sep. 18, 2017.

* cited by examiner

[Fig. 1]
| Degree of freedom | |0⟩ | |1⟩ | Incompatible bases |
|---|---|---|---|
| Phase | Fixed phase P0 | P0+pi | pi/2 shifted phase |
| Phase difference | 0 | Pi | pi/2 shifted phase |
| Temporal location | Time t0 | t0+delta | Hadamard base |
| Polarisation | Horizontal | Vertical | Diagonal base |
| Frequency | f1 | f2 | Hadamard base |
The HV base (to the left) and the diagonal base (to the right) for the polarisation
[Fig. 2]
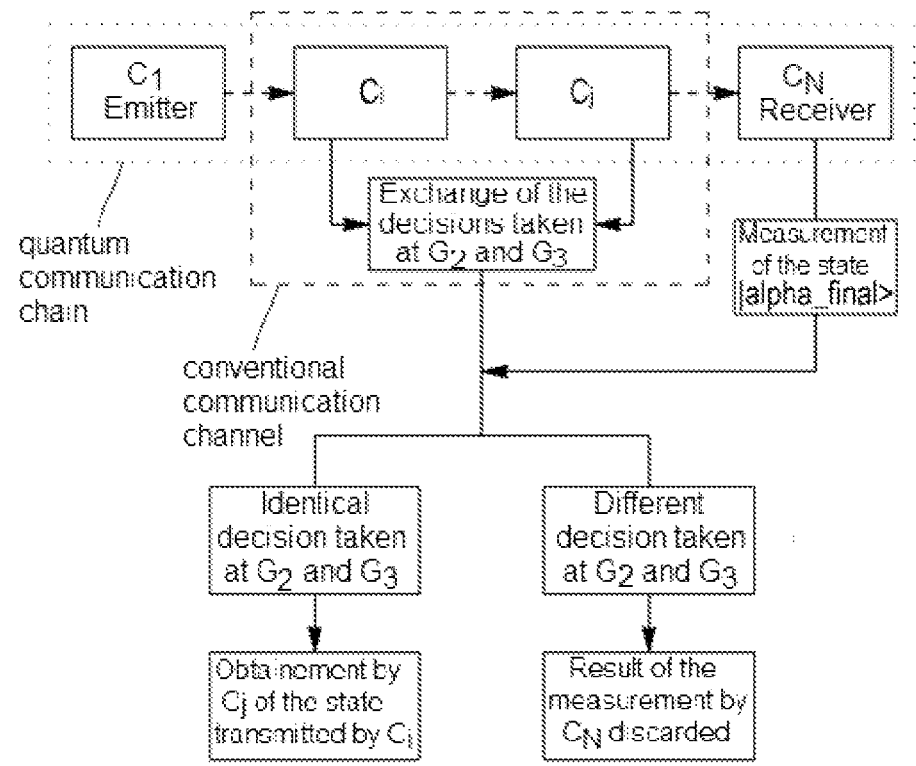

[Fig. 3]
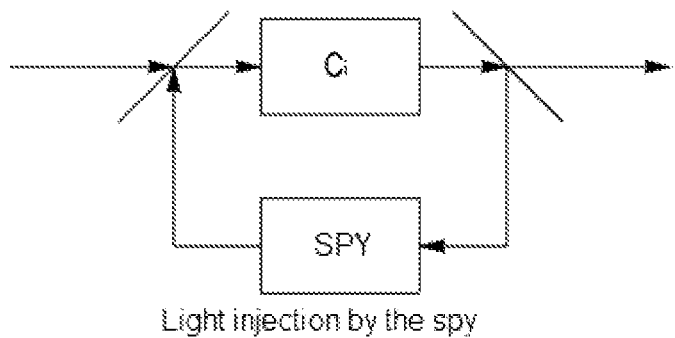
[Fig. 4]
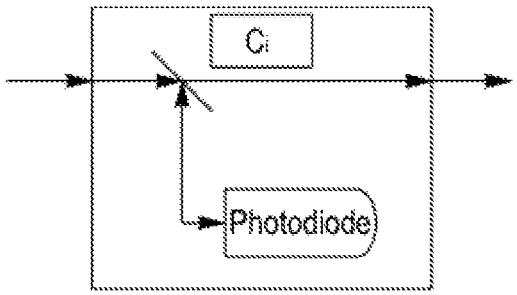
Light injection by the spy
[Fig. 5]
Countermeasure: $C_i$ samples photons to measure the average light intensity
[Fig. 6]
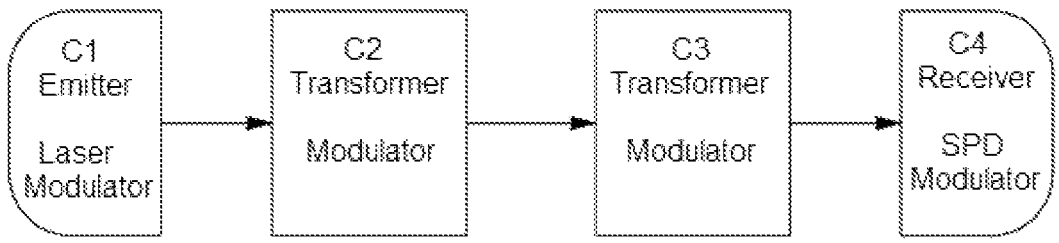

[Fig. 7]
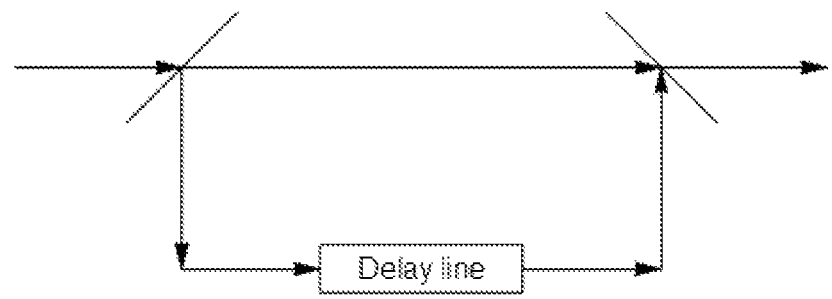
[Fig. 8]
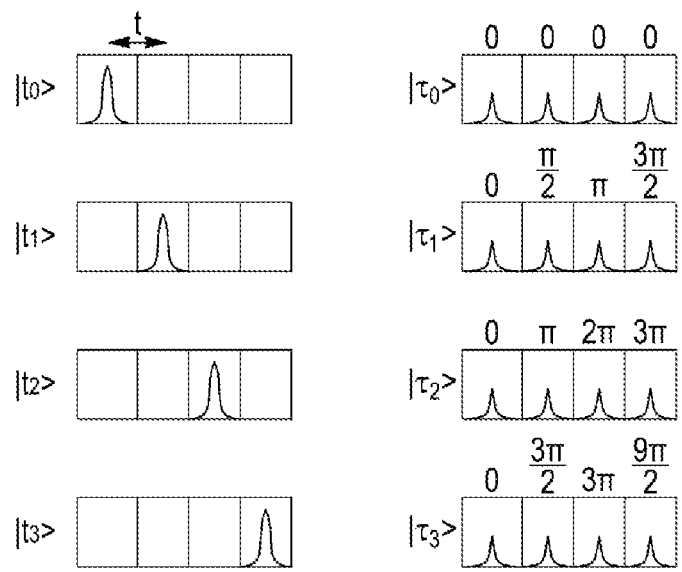

METHOD FOR SECURELY TRANSMITTING SEQUENCES OF QUANTUM STATES BETWEEN A PLURALITY OF ONLINE PARTICIPANTS OVER A QUANTUM COMMUNICATION CHANNEL

CROSS-REFERENCE TO RELATED APPLICATIONS

The present application is a filing under 35 U.S.C. 371 as the National Stage of International Application No. PCT/EP2020/074576, filed Sep. 3, 2020, entitled "METHOD FOR SECURELY TRANSMITTING SEQUENCES OF QUANTUM STATES BETWEEN A PLURALITY OF ONLINE PARTICIPANTS OVER A QUANTUM COMMUNICATION CHANNEL," which claims priority to France Application No. 1909839 filed with the Intellectual Property Office of France on Sep. 6, 2019, both of which are incorporated herein by reference in their entirety for all purposes.

The present invention generally relates to the field of quantum communication and more particularly to a method and a device for exchanging sequences of quantum states between several participants of the same quantum communication channel.

Quantum communication consists in exchanging quantum states, encoded on quantum bits or qubits, between several participants. When the quantum states to be exchanged should be exchanged secretly, quantum communication is coupled with quantum cryptography methods, these consisting in using the properties of quantum physics to establish cryptography protocols, i.e. which ensure the confidentiality of the exchanged data, allowing securing the quantum communication.

An example of a well-known quantum communication protocol is quantum key distribution (QKD), which enables two participants connected by an insecure quantum communication channel to establish a random key which could be used to encrypt a standard conventional communication. In a quantum key distribution protocol, there are two participants generally playing a different role: an emitter, who sends quantum information in the form of qubits, and a receiver, which decodes this information using an appropriate device.

In quantum key distribution protocols used in practice, a person skilled in the art knows how to encode the qubits forming the key to be distributed in photons. The generation of the photons is carried out by a laser, the encoding of the photons is carried out by a modulator of optical properties, and the decoding by the receiver by a bench involving a photon detector. At the end of the protocol, the emitter and the receiver share a secret chain of random qubits.

A technical problem that the invention aims to solve is to propose a secure method for the exchange of a flux of quantum states between two participants among a number of participants of the same quantum communication channel greater than or equal to three and forming a quantum communication chain, the two participants exchanging a stream of quantum states which might be different from the so-called emitter and receiver participants in a quantum key distribution protocol of the prior art, as well as a device for implementing this method, said device using simple and very limited hardware.

In order to solve this problem, the Applicant has developed a method for securely transmitting a sequence of Q quantum states $q_q$ encoded in the form of a sequence of Q photons, q being an integer comprised between 1 and Q, between a first participant and a second participant, selected amongst a plurality of N distinct participants of the same quantum communication channel forming a communication chain between an emitter and a receiver, where N is an integer greater than or equal to 3, wherein the first participant is located upstream of the second participant in the communication chain, said method comprising, in order:
the succession of the following steps, repeated from q=1 to Q:
a first action performed by the emitter comprising
the preparation by the emitter of a photon in a start quantum state $|u\rangle$ of an orthonormal encoding base $B_a$ with a dimension d and of base states $|e0\rangle$, $|e1\rangle$, ... $|ed-1\rangle$, with a randomly chosen between 0 and 1,
transmission of the prepared photon in the communication chain,
a second action performed by the first participant on said photon, of decision of transformation or not of the quantum state of the transmitted photon, in an orthogonal base quantum state in the encoding base $B_0$ and in the encoding base $B_1$ a third action performed by the second participant on said photon, of decision of transformation or not of the quantum state of the photon received from the immediately preceding participant into a corresponding orthogonal quantum state in the encoding base $B_0$ and in the encoding base $B_1$
a fourth action performed by the receiver comprising the measurement, in the standard base $B_0$ or in the base $B_1$, of the final state $|alpha_{final}\rangle$ of the photon transmitted in the communication chain by the receiver,
exchanges on a conventional communication channel between at least part of the participants, at least part of the decisions among those of the start base a, of the start state $|u\rangle$, of the measurement base chosen by said receiver and the result of the measurement of $|alpha_{final}\rangle$ in this measurement base,
obtaining, between the first and second participants, a description of the transmitted quantum state $q_q$ corresponding to one of the base states $|e_0\rangle$, $|e_1\rangle$, ... $|e_{d-1}\rangle$, thanks to said part of the decisions and said result of the measurement;
then, the reconstitution, by the first and second participants, by concatenation, of a sequence of the descriptions of the transmitted Q quantum states $q_q$, for q ranging from 1 to Q.

By the expression communication chain, it should be understood a succession of participants connected to each other. More specifically, the participant $C_1$ is connected to the participant $C_2$; for i comprised between 2 and N−1, the participant $C_i$ succeeds and is connected to the participant $C_{i-1}$, and precedes and is connected to the participant $C_{i+1}$; the participant $C_{N-1}$ precedes and is connected to the last participant $C_N$.

In particular, according to one embodiment, for each repetition from q=1 to Q of the succession of steps
The first action, performed by the emitter, comprises the following steps:
Choose a value sq equal to 0 or 1
Choose a value l comprised between 0 and d−1
Apply a transformation $P^{sq}X_l$ to a reference photon created by the emitter at the start of the communication chain the second action, performed by the first participant, comprises the following steps:
Choose a value m comprised between 0 and d−1
Apply a transformation $X_m$ to the photon received through the communication chain,
the third action, performed by the second participant, comprises the following steps:
Choose a value n comprised between 0 and d−1
Apply a transformation $X_n$ to the photon received through the communication chain,
the fourth action, performed by the receiver, comprises the following steps:
Choose a value tq equal to 0 or 1
Apply a transformation $P^{(-1)tq}$ to the photon received through the communication chain,
wherein:
the notation $P^1$ means that the transformation P takes place,
the notation $P^0$ means that the transformation P does not take place,
the notation $P^{(-1)1}$ means that the transformation $P^{(-1)}$ takes place,
the notation $P^{(-1)0}$ means that the transformation $P^{(-1)}$ does not take place,
the notation $X_m$ refers to a transformation allowing switching from the base quantum state |t>, t being an integer comprised between 0 and d−1, into the orthogonal state c|(t+m) mod d> in the base $B_0$ or the transformation allowing switching from a state $|e_t>$ into d|$e_t$+m mod d> in the base $B_1$, for m an integer comprised between 0 and d−1, and c and d global phases induced by these transformations.

According to another embodiment of the invention, for each repetition from q=1 to Q of the succession of steps:
the first action comprises the preparation by the emitter of a photon in a quantum state with a reference base |0> of an orthonormal encoding base $B_0$, called standard base with a dimension d,
the second action performed by the first participant, comprises the following steps:
Choose a value sq equal to 0 or 1
Choose a value m comprised between 0 and d−1
Apply a transformation $P^{sq}X_m$ to the photon received through the communication chain, or in the case where i is equal to 1, to the photon at the start of the communication chain,
the third action, performed by the second participant, includes the following steps:
Choose a value tq equal to 0 or 1
Choose a value n between 0 and d−1
Apply a transformation $X_n P^{(-1)tq}$ to the photon received through the communication chain,
wherein:
the notation $P^1$ means that the transformation P takes place,
the notation $P^0$ means that the transformation P does not take place,
the notation $P^{(-1)1}$ means that the transformation $P^{(-1)}$ takes place,
the notation $P^{(-1)0}$ means that the transformation $P^{(-1)}$ does not take place,
the notation $X_m$ refers to a transformation allowing switching from the base quantum state |t>, t being an integer comprised between 0 and d−1, into the orthogonal state |(t+m) mod d> in the base Boor the transformation allowing switching from a state $|e_t>$ to $|e_{t+m \ mod \ d}>$ in the base $B_1$, for m an integer comprised between 0 and d−1.

A particular embodiment is that where the dimension d of the encoding base is equal to 2.

According to one embodiment, the photon is transmitted through a frequency filter and a time gate.

In an embodiment of the secure transmission method described in this application, where the number of participants N is greater than or equal to 4, where the first and second participants are neither emitter, or receiver, and where the sequence of Q photons encoding the sequence of the Q quantum states has a given light power, the second step of deciding whether to apply or not a transformation P allowing performing a change of the encoding base, from the standard base $B_0$ into an encoding base $B_1$ incompatible with the standard base $B_0$ is immediately followed by:
a fifth step of sampling a first portion of the light power of the flux of photons received from the participant immediately preceding the first participant,
a sixth step of comparing the first portion with a second portion of the light power of the flux of photons sent by the emitter in order to detect a potential injection of spy photons before the first participant.

In an embodiment of the secure transmission method, the fourth step of deciding whether to transform or not the quantum state of the received photon into a corresponding orthogonal quantum state in the encoding base resulting from the third step is immediately followed by:
a seventh step of sampling a third portion of the light power of the flux of photons received from the participant immediately preceding the second participant,
an eighth step of comparing the third portion with a fourth portion of the difference between the light power of the flux of photons sent by the emitter and the first portion in order to detect a potential injection of spy photons before the second participant.

Advantageously, each quantum state is encoded in a degree of freedom of the photon selected amongst the phase, the phase difference, the temporal location, the polarisation or the frequency of the photon.

Advantageously, in the secure transmission method according to the invention, the sequence of Q quantum states is randomly chosen in order to establish a quantum key.

Another object of the present invention is a device for implementing the previously-described secure transmission method, comprising:
a laser adapted to generate photons and an initial modulator adapted to modulate a degree of freedom of a generated photon,
N−2 intermediate modulators adapted to modulate a degree of freedom of a received photon,
a photon detector adapted to detect unique photons and a final modulator adapted to modulate a degree of freedom of a received photon, Advantageously, the laser and the initial modulator are associated to the emitter and are adapted to of be controlled by the emitter. Advantageously, each of the N−2 intermediate modulators is associated to an intermediate participant among the N−2 intermediate participants other than the emitter and the receiver and is adapted to be controlled by said intermediate participant. Advantageously, the photon detector and the final modulator are associated to the receiver and are adapted to be controlled by the receiver.

Thus, the connection between the N participants of the communication chain could be achieved by the transmission of a photon generated by the laser associated to the emitter through the initial modulator, the N−2 intermediate modulators, the final modulator, up to the photon detector associated to the receiver.

In a variant of the previously-described device, the latter may further comprise, in the case where the first participant and the second participant are both distinct from the emitter and the receiver:
  a first beam splitter positioned upstream of the modulator associated to the first participant,
  a first photodiode associated to the first participant and adapted to measure a light power of a flux of photons,
  a second beam splitter positioned upstream of the modulator associated to the second participant,
  a second photodiode associated to the second participant and adapted to measure a light power of a flux of photons, This variant of the device allows implementing the embodiment of the secure transmission method in which the fifth, sixth and seventh steps take place.

Advantageously, the first beam splitter is adapted to separate a flux of photons received from the participant immediately preceding the first participant in the communication chain in two distinct directions, one towards the modulator associated to the first participant then towards the rest of the communication chain, the other towards the first photodiode. Advantageously, the second beam splitter is adapted to separate a flux of photons received from the participant immediately preceding the second participant in the communication chain in two distinct directions, one towards the modulator associated to the second participant then towards the rest of the communication chain, the other towards the second photodiode.

In the case where the degree of freedom of the photon encoding the quantum state is the phase of this photon, the initial modulator, the N−2 intermediate modulators and the final modulator may consist of phase modulators.

In the case where the degree of freedom of the photon encoding the quantum state is the polarisation of this photon, the initial modulator, the intermediate modulators and the final modulator may consist of polarisation modulators.

In the case where the degree of freedom of the photon encoding the quantum state is the time location of this photon, each of the initial modulator, the intermediate modulators and the final modulator may comprise a number of delay lines equal to the dimension d of the encoding base of the quantum bits and a number of splitter plates equal to twice the number of delay lines Other advantages and features of the present invention will arise from the following detailed description, given as a non-limiting example and made with reference to the appended figures:

FIG. 1 illustrates several examples of degrees of freedom for encoding quantum bits as well as examples of associated incompatible bases.

FIG. 2 is a block diagram of the method for securely transmitting a quantum state between two participants of a communication chain comprising N online participants according to a first embodiment.

FIG. 3 illustrates an example of the effect of transformations that could be applied to a reference quantum state in the context of the method for securely transmitting sequences of quantum states.

FIG. 4 illustrates an embodiment of a side-channel attack in an optical quantum communication device.

FIG. 5 illustrates an additional step carried out in a second embodiment of the method for securely transmitting a quantum state.

FIG. 6 illustrates an embodiment of a device for the implementation of the method for securely transmitting a sequence, for a quantum communication chain of 4 participants.

FIG. 7 illustrates a temporal location modulator device

FIG. 8 is an example of incompatible bases in a 4-dimensional Hilbert vector space.

DETAILED DESCRIPTION

The present invention presents a method for secure transmission for sending sequences of quantum states, encoded on quantum bits, between several online participants over a quantum communication channel. In the embodiments and examples presented hereinbelow, the quantum bits are encoded with photons within a degree of freedom thereof. By photon degree of freedom, it should be understood a physical property described by quantum mechanics and usable for quantum communications. Examples of degrees of freedom of photons are the phase, the phase difference, the frequency, the polarisation or even the temporal location. In this description, the formalism that represents a quantum state in the form of a vector $|\alpha\rangle$ in a Hilbert vector space with a dimension d is used. The concept of Hilbert vector space extends the methods of linear algebra by generalising the notions of Euclidean space (such as the Euclidean plane or the usual 3-dimensional space) and of Hermitian space to spaces of any dimension (finite or infinite). A vector $|\alpha\rangle$ of a d-dimensional Hilbert vector space could be described by means of a base of the d-dimensional Hilbert vector space. For the following description of embodiments and examples that follow, the concept of incompatible bases will be used. Two bases of the same Hilbert vector space are said incompatible if each vector of one of the two bases has projections of equal length on each of the vectors of the other base. FIG. 1 gives examples of incompatible bases for different photon degrees of freedom, in a 2-dimensional Hilbert vector space.

A first embodiment of the invention is described herein in the particular case of a Hilbert vector space with a dimension d, d being an integer greater than or equal to 2, and in the case of a communication chain comprising N online participants $C_1, \ldots C_i, \ldots C_j \ldots$ and $C_N$, where $C_1$ is the emitter participant and $C_N$ is the receiver participant, and where N is an integer greater than or equal to 3. FIG. 2 illustrates this first embodiment. The intermediate participants $C_2$ to $C_{N-1}$ are called processors. By "emitter", reference is made to a participant provided with an appropriate device capable of sending quantum information, in particular quantum bits encoding quantum states. Herein, since it is considered that the quantum bits are encoded in photons, the device available to the emitter is a laser generating photons. By "receiver", reference is made to a participant provided with an appropriate device capable of decoding the quantum information sent by an emitter, in particular measuring a quantum state related to a received quantum bit. In the case where the quantum bits are encoded in photons, the device available to the receiver may be a single photon detector SPD. By "transformer", in the case where the quantum bits are encoded in photons, reference is made to a participant provided with hardware enabling him to modulate the optical signal he receives. A transformer is deemed to have limited hardware and can only modulate the optical signal it receives, but cannot create a signal itself or measure the quantum state of a photon it receives.

In the secure transmission method described in this application, two distinct participants $C_i$ and $C_j$ among the participants $C_1$ to $C_N$ of the communication chain, $C_i$ being the participant furthest upstream in the communication chain, $C_j$ the one furthest downstream in the communication chain, decide to share a sequence of Q quantum states $q_q$, for q an integer comprised between 1 and Q, said sequence having a light power $P_{seq}$ in number of photons per second. Depending on the nature of the participants $C_i$ and $C_j$, the secure transmission method may have steps in a different order. Also, the participants $C_i$ and $C_j$ are known to everyone, i.e. to the other participants in the communication chain but also to the public.

In particular, according to the invention, the succession of the following steps, the method may be schematised as an iterative process for each from q=1 to Q, including at each iteration:

a first action performed by the emitter C1 comprising
the preparation by the emitter C1 of a photon in a start quantum state |u> of an orthonormal encoding base Ba with a dimension d and base states $|e_0>$, $|e_1>$, ... $|e_{d-1}>$, with a randomly chosen between 0 and 1,
transmission of the prepared photon in the communication chain, a second action performed by the first participant Ci on said photon, of decision of transformation or not of the quantum state of the transmitted photon, in an orthogonal base quantum state in the encoding base $B_0$ and in the encoding base $B_1$, a third action performed by the second participant $C_j$ on said photon, of decision of transformation or not of the quantum state of the photon received from the immediately preceding participant $C_{j-1}$ in a corresponding orthogonal quantum state in the encoding base $B_0$ and in the encoding base $B_1$ a fourth action performed by the receiver $C_N$ comprising the measurement, in the standard base $B_0$ or in the base $B_1$, of the final state $|alpha_{final}>$ of the photon transmitted in the communication chain by the receiver $C_N$, exchange on a conventional communication channel between at least part of the participants, of at least part of the decisions among those of the start base a, of the start state |u>, of the measurement base chosen by said receiver CN and of the result of the measurement of $|alpha_{final}>$ in this measurement base, obtaining, between the first and second participants Ci and Cj, of a description of the transmitted quantum state qq corresponding to one of the base states $|e_0>$, $|e_1>$, ... $|e_{d-1}>$, thanks to said part of the decisions and said result of the measurement;

Then, when the Q iterations have been performed, the reconstitution, by the first and second participants Ci and Cj, by concatenation, of a sequence of descriptions of the Q transmitted quantum states $q_q$, for q ranging from 1 to Q.

According to a first embodiment, the emitter C1 performs a first action which comprises the following steps:

Choose a value sq equal to 0 or 1

Choose a value l comprised between 0 and d−1

Apply a transformation $P^{sq}X_l$ to a reference photon created by the emitter at the start of the communication chain The first participant $C_i$ then performs a second action which comprises the following steps:

Choose a value m comprised between 0 and d−1

Apply a transformation $X_m$ to the photon received through the communication chain, The second participant $C_j$ performs a third action, which comprises the following steps:

Choose a value n comprised between 0 and d−1

Apply a transformation $X_n$ to the photon received through the communication chain, The receiver, finally, performs a fourth action, which comprises the following steps:

Choose a value tq equal to 0 or 1

Apply a transformation $P^{(-1)tq}$ to the photon received through the communication chain, Then, an exchange is performed on a conventional communication channel between at least part of the participants, of at least part of the decisions among those of the start base a, of the start state |u>, of the measurement base chosen by said receiver (CN) and of the result of the measurement of $|alpha_{final}>$ in this measurement base.

This exchange enables each of the first and second participants to obtain information from the emitter, from the receiver of the other participant.

This information comprises a description of the transmitted quantum state $q_q$ corresponding to one of the base states $|e_0>$, $|e_1>$, ... $|e_{d-1}>$, thanks to said part of the decisions and the result of the measurement;

One of the advantages of this embodiment is that the operations of the emitter and of the receiver are commonly used in the absence of other participants on the communication line, i.e. on currently deployed quantum communication networks, to establish shared encryption keys. Thus, intermediate participants could be added a posteriori on already deployed quantum communication architectures without modifying the operations of the emitter and of the receiver, thereby extending the capabilities of said architecture.

Below, another embodiment will be described. The explanations related to this embodiment and the described variants are provided without losing sight of generality and could apply, mutatis mutandis, to the first embodiment described before.

In this second embodiment, a first case of a method for securely transmitting a sequence of quantum states is considered herein where the participants $C_i$ and $C_j$ are participants different from the participants $C_1$ and $C_N$, i.e. they are neither emitter nor receiver, but mere transformers. N is then an integer greater than or equal to 4. FIG. 2 gives a general illustration of this method for securely transmitting a sequence of quantum states. The steps of the method for securely transmitting the sequence of quantum states could then consist in repeating the following steps, for q being an integer comprised between 1 and Q:

in a first action, the emitter participant $C_i$ sends through the communication chain a photon prepared in a quantum state with a reference base |0> of a work encoding base $B_0$ called standard base, orthonormal, with a dimension d, and orthogonal base states |0>, |1>, ... |d−1>:

the first participant $C_i$ performs a second action which could be considered as composed of two successive steps $G_1$ and $G_2$ upon reception of the photon transmitted in the communication chain, more specifically:
in a first step $G_1$, the first participant $C_i$ decides whether or not to transform the quantum state of the photon received, or generated, into a base quantum state |m> orthogonal to the state |0> in the encoding base $B_0$,
in a second step $G_2$, the first participant $C_i$ decides whether or not to apply a transformation P allowing carrying out a change of the encoding base, from the standard base $B_0$ into an orthonormal encoding base $B_1$ and with a dimension d, incompatible with the standard base $B_0$, with orthogonal base states $|e_0\rangle$, $|e_1\rangle$, ... $|e_{d-1}\rangle$;

the photon derived from the second step $G_2$ is propagated in the communication chain;

the second participant $C_j$ performs a third action which could be considered as composed of two successive steps $G_3$ and $G_4$ upon reception of the photon transmitted in the communication chain, more specifically:

in a third step $G_3$, the second participant $C_j$ decides whether or not to apply the inverse transformation of the transformation P, denoted $P^{(-1)}$, allowing performing a change of encoding base, from the encoding base $B_1$ into the standard base $B_0$;

in a fourth step $G_4$, the second participant $C_j$ decides whether or not to transform the quantum state of the photon received from the participant $C_{j-1}$ into a corresponding orthogonal quantum state in the encoding base resulting from step $G_3$;

the photon from the fourth step $G_4$ is propagated in the communication chain;

the receiver $C_N$ detects and measures in the standard base $B_0$ the state $|alpha_{final}\rangle$ of the photon transmitted in the communication chain.

the first and second participants $C_i$ and $C_j$ exchange with each other over a conventional communication channel their encoding base transformation decisions resulting from the second and third steps $G_2$ and $G_3$;

the first and second participants $C_i$ and $C_j$ obtain a description of the quantum state $q_q$ corresponding to one of the base states $|0\rangle$, $|1\rangle$, ... $|d-1\rangle$, thanks to the encoding base information exchanged therebetween and to the measurement of the final state $|alpha_{final}\rangle$.

Examples of conventional communication channels are Ethernet connections, Wifi, or TCP/IP protocols.

After the Q repetitions have been performed, the first and second participants $C_i$ and $C_j$ reconstitute, by concatenation, a sequence of the descriptions of the Q quantum states $q_q$.

It will now be described on the one hand, what should be understood by the term "description of a quantum state $q_q$", and on the other hand how securing the transmission of the sequence of quantum states by the protocol described in the previous case is carried out. The first and second actions performed by the first and second participants $C_i$ and $C_j$ transcribe a method for applying the principle of conjugate encoding. Conjugate encoding consists in encoding information in a quantum state while keeping the base in which this information is encoded secret. This principle is based in particular on the use of two encoding bases of a Hilbert vector space that are incompatible with each other. Taking into account a quantum state in one of the two bases, this one, if measured in a corresponding incompatible base, will behave in a completely random manner. Indeed, the definition given above of two incompatible bases, i.e. the projection of each vector of one of the two bases has projections of equal length on each of the vectors of the other base could be mathematically formulated as follows, taking the example of aforementioned bases $B_0$ and $B_1$:

For m and n integers comprised between 0 and d−1:

$$\langle m|e_n\rangle = 1/\sqrt{d} \qquad \text{[Math. 1]}$$

and $$\langle e_m|n\rangle = 1/\sqrt{d} \qquad \text{[Math. 2]}$$

where $\langle ... | ... \rangle$ 22 refers to the scalar product of the Hilbert vector space of definition of the state vectors.

In quantum mechanics, the quantities $|\langle m|e_n\rangle|^2$ and $|\langle e_m|n\rangle|^2$ respectively represent the probabilities of finding a system in an initial state $|e_n\rangle$ in the state $|m\rangle$, if a measurement is made in the standard base $B_0$, and of finding a system in an initial state $|n\rangle$ in the state $|e_m\rangle$, if a measurement is performed in the incompatible base $B_1$. Thus, all these probabilities are equal. Hence, it could be concluded that the measurement, in the corresponding incompatible base, of a state prepared in either of the bases $B_0$ or $B_1$ would give a completely random measurement result.

Thus, in the method for securely transmitting a sequence of Q quantum states, only two configurations enable a quantum state transmission providing relevant information, i.e., a result of the measurement by the receiver $C_N$ that could be used by the first and second participants $C_i$ and $C_j$: this is either the case where both the first and second participants $C_i$ and $C_j$ decide during the second and third steps $G_2$ and $G_3$ to respectively apply the transformations P and $P^{(-1)}$, or the case where neither of the two decides during the second and third steps $G_2$ and $G_3$ to apply the transformation P, respectively $P^{(-1)}$. Indeed, in these two cases, the third step $G_3$ allows undoing the transformation performed during the second step $G_2$ and returning to the base $B_0$, wherein the measurement done by the receiver $C_N$ will give a non-random measurement result. The state measured by the receptor $C_N$ will be that one resulting from the transformations derived from the first and fourth steps $G_1$ and $G_4$. Thus, securing the method for transmitting the sequence of quantum states originates from the fact that the state measured by the receiver $C_N$ is that of the succession of the transformations derived from the first and fourth steps $G_1$ and $G_4$, but does not allow determining the state, chosen by the first participant $C_i$, during the sub-step $G_1$, transmitted to the second participant $C_j$. The latter is masked by the combination of the first and second actions performed respectively by the first participant $C_i$ and the second participant $C_j$.

In the case where the first participant $C_i$ decides to apply the transformation P during the second step $G_2$, and the second participant $C_j$ decides not to apply the transformation $P^{(-1)}$ during the sub-step $G_3$, or conversely, in the case where the first participant $C_i$ decides not to apply the transformation P during the sub-step $G_2$, and the second participant $C_j$ decides to apply the transformation $P^{(-1)}$ during the third step $G_3$, the information that would have circulated in the communication chain and measured by the receiver $C_N$ will not be relevant, i.e., the result of the measurement performed by the receiver $C_N$ will not be able to be exploited by the first and second participants $C_i$ and $C_j$. Indeed, it will correspond to a measurement of a state of a base $B_0$ or $B_1$ in the corresponding incompatible base, and, as explained before, to a completely random result. In practice, this result of the transmission of the corresponding quantum bit will be withdrawn and discarded.

This is why the term "description of a quantum state $q_q$" is used to generalise the result of the measurement done by the receiver $C_N$ because the quantum information deduced from this measurement is not necessarily relevant and does not necessarily correspond to the nature of the state $q_q$.

Thus, depending on the decisions taken by the first and second participants $C_i$ and $C_j$, information encoded in a quantum bit could be transmitted from the first participant $C_i$ to the second participant $C_j$ in a secure manner because the other participants, different from $C_i$ and $C_j$, only have access, when the receiver $C_N$ announces the measurement of the final state, to information relating to the state $|alpha_{final}\rangle$ of the photon transmitted in the communication chain. From a statistical point of view, on average, and because of the configurations where the quantum information relating to the state $|alpha_{final}\rangle$ is random and therefore irrelevant, one out of two quantum states can be transmitted by the first participant $C_i$ to the second participant $C_j$ in a hidden manner from the other participants in the communication chain.

Consider herein a second case where the first participant $C_i$ is the emitter participant $C_1$ but the participant $C_j$ is just a transformer, different from the receiver $C_N$. N is then an integer greater than or equal to 3. The steps of the method for securely transmitting the sequence of quantum states may then consist in repeating the following steps, for q being an integer comprised between 1 and Q:

- the emitter $C_1$ performs the first action described in the first case and composed of the first and second successive steps $G_1$ and $G_2$;
- the photon derived from the second step $G_2$ is propagated in the communication chain;
- the second participant $C_j$ performs the second action described in the first case and composed of the third and fourth successive steps $G_3$ and $G_4$;
- the photon derived from the fourth step $G_4$ is propagated in the communication chain;
- the receiver $C_N$ detects and measures in the standard base $B_0$ the state $|alpha_{final}\rangle$ of the photon transmitted in the communication chain.
- the emitter $C_1$ and the second participant $C_j$ exchange with each other on a conventional communication channel the encoding bases resulting from steps $G_2$ and $G_3$;
- the emitter $C_1$ and the second participant $C_j$ obtain a description of the quantum state $q_q$ corresponding to one of the base states $|0\rangle, |1\rangle, \ldots |d-1\rangle$, thanks to the encoding base information exchanged therebetween and to the measurement of the final state $|alpha_{final}\rangle$.

After the Q repetitions have been performed, the emitter $C_1$ and the second participant $C_j$ reconstitute, by concatenation, a sequence of the descriptions of the Q quantum states $q_q$, discarding, where necessary, the irrelevant and non-exploitable descriptions.

Consider herein a third case where the first participant $C_i$ is a transformer, different from the emitter $C_1$, and the participant $C_j$ is the receiver $C_N$, and where N is an integer greater than or equal to 3. The steps of the method for securely transmitting the sequence of quantum states may then consist in repeating the following steps, for q being an integer comprised between 1 and Q:

- the emitter $C_1$ sends through the communication chain a photon prepared in a quantum state with a reference base $|0\rangle$ of a work encoding base $B_0$ called standard base, orthonormal and with a dimension d, and orthogonal base states $|0\rangle, |1\rangle, \ldots |d-1\rangle$:
- the first participant $C_i$ performs the first action described in the first case and composed of the first and second successive steps $G_1$ and $G_2$;
- the photon derived from the second step $G_2$ is propagated in the communication chain;
- the receiver $C_N$ detects the photon it receives, performs the second action described in the first case and composed of the third and fourth successive steps $G_3$ and $G_4$, then measures in the standard base $B_0$ the state $|alpha_{final}\rangle$ of the photon derived from the fourth step $G_4$; the first participant $C_i$ and the receiver $C_N$ exchange with each other on an encrypted conventional communication channel the encoding bases resulting from the second and third steps $G_2$ and $G_3$;
- the first participant $C_i$ and the receiver $C_N$ obtain a description of the quantum state $q_q$ corresponding to one of the base states $|0\rangle, |1\rangle, \ldots |d-1\rangle$, thanks to the base encoding information exchanged therebetween and to the measurement of the final state $|alpha_{final}\rangle$.

After the Q repetitions have been performed, the first participant $C_i$ and the receiver $C_N$ reconstitute, by concatenation, a sequence of the descriptions of the Q quantum states $q_q$, discarding, where necessary, the irrelevant and non-exploitable descriptions.

A fourth and last case is considered herein where the first participant $C_i$ is the emitter $C_1$ and the second participant $C_j$ is the receiver $C_N$, and where N is an integer greater than or equal to 3. The steps of the method for securely transmitting the sequence of quantum states may then consist in repeating the following steps, for q being an integer comprised between 1 and Q:

- the emitter $C_1$ performs the first action described in the first case and composed of the first and second successive steps $G_1$ and $G_2$;
- the photon derived from the second step $G_2$ is propagated in the communication chain;
- the receiver $C_N$ detects the photon it receives, performs the second action described in the first case and composed of the third and fourth successive steps $G_3$ and $G_4$, then measures in the standard base $B_0$ the state $|alpha_{final}\rangle$ of the photon derived from step $G_4$;
- the emitter $C_1$ and the receiver $C_N$ exchange with each other on an encrypted conventional communication channel the encoding bases resulting from steps $G_2$ and $G_3$;
- the emitter $C_1$ and the receiver $C_N$ obtain a description of the quantum state $q_q$ corresponding to one of the base states $|0\rangle, |1\rangle, \ldots |d-1\rangle$, thanks to the encoding base information exchanged therebetween and according to the final state $|alpha_{final}\rangle$.

After the Q repetitions have been performed, the emitter $C_1$ and the receiver $C_N$ reconstitute, by concatenation, a sequence of the descriptions of the Q quantum states $q_q$, discarding, where necessary, the irrelevant and non-exploitable descriptions.

For the previously-described second, third and fourth cases, the principle of securing the transmission of sequences of quantum states through the communication chain of the N participants and the concept of descriptions of quantum states are the same as those described for the first case of secure transmission.

The first and second actions carried out respectively by the first and second distinct participants $C_i$ and $C_j$ in the four different cases of securely transmitting sequences of quantum states will now be formally described.

Consider a Hilbert vector space encoding d-dimensional quantum states. The first action to carry out, during the q-th repetition of the succession of previously-described steps by the participant $C_i$ may thus consist of the following steps:

- the first participant $C_i$ chooses a value $s_q$ equal to 0 or 1
- the first participant $C_i$ chooses an integer value m comprised between 0 and d-1
- the first participant $C_i$ applies a transformation $P^{s_q}X_m$ to the photon received through the communication chain, or in the case where i is equal to 1, to the photon at the start of the communication chain, where, it is recalled, the notation P designates a transformation allowing performing a change in the encoding base, from the standard base $B_0$ into an orthonormal encoding base $B_1$, i.e. for m an integer comprised between 0 and d−1:

$$P|m\rangle = e_m \qquad \text{[Math. 3]}$$

and where the notation $X_m$ designates the following transformations, respectively in the base $B_0$ and the base $B_1$, for m and t two integers comprised between 0 and d−1:

$$X_m|t\rangle = |t+m \bmod d\rangle \qquad \text{[Math. 4]}$$

and $$X_m|e_t\rangle = |e_{t+m \bmod d}\rangle \qquad \text{[Math. 5]}$$

where the abbreviation mod stands for the mathematical function modulo.

The transformation $X_m$ corresponds to the first step $G_1$, and the transformation $P^{sq}$ corresponds to the second one $G_2$. The effect of the first action performed by the first participant Ci, $P^{sq}X_m$, on a reference state $|0\rangle$ is illustrated in FIG. 3. The $|+\rangle$ and $|-\rangle$ states are defined as follows:

$$|+\rangle = \frac{1}{\sqrt{2}}(|0\rangle + |1\rangle) \qquad \text{[Math. 6]}$$

$$|-\rangle = \frac{1}{\sqrt{2}}(|0\rangle - |1\rangle) \qquad \text{[Math. 7]}$$

The second action carried out, during the q-th repetition of the succession of previously-described steps by the second participant $C_j$ may thus consist of the following steps:
- the second participant $C_j$ chooses a value $t_q$ equal to 0 or 1;
- the second participant $C_j$ chooses a value n comprised between 0 and d−1;
- the second participant $C_j$ applies a transformation $X_n P^{(-1)tq}$ to the photon received through the communication chain where the notation $P^{(-1)}$ designates the transformation enabling a change in the encoding base, from the incompatible base $B_1$ into the standard base $B_0$, i.e. for m an integer comprised between 0 and d−1:

$$P^{(-1)}|e_m\rangle = |m\rangle \qquad \text{[Math. 8]}$$

and where:
- the notation $P^{(-1)0}$ means that the transformation $P^{(-1)}$ does not take place;
- the notation $P^{(-1)1}$ means that the transformation $P^{(-1)}$ takes place, The transformation $P^{(-1)tq}$ corresponds to the third step $G_3$, and the transformation $X_n$ corresponds to the fourth step $G_4$.

Thus, in the two configurations enabling a quantum state transmission providing relevant information, i.e. either the configuration where both of the participants $C_i$ and $C_j$ decide during the second and third steps $G_2$ and $G_3$ to apply the transformations P and $P^{(-1)}$ respectively, i.e. the configuration where neither of the two decides during the second and third steps $G_2$ and $G_3$ to apply the transformations P and $P^{(-1)}$ respectively, the resulting encoding base at step $G_4$ is the standard base $B_0$. The final state $|\text{alpha}_{\text{final}}\rangle$ is equal to $|m+n \bmod d\rangle$ and could be measured in the standard base $B_0$ by the receiver $C_N$. The result of the measurement announced by the receiver is m+n mod d. All participants ignoring the value of m and n, i.e. all participants except the first and second participants $C_i$ and $C_j$ learn nothing about the value m+n mod d. The transformation $X_n$ has the effect of masking the state transmitted by the first participant $C_i$ when it is measured and announced by the receiver $C_N$. Due to the disclosure of the result of the measurement by the receiver $C_N$, m+n mod d, the participant $C_j$ can thus deduce the state $|m\rangle$ transmitted to him by the participant $C_i$. Indeed, the transmission of the quantum state by the first participant $C_i$ to the second participant $C_j$ has been performed in a secure manner, because all of the other participants in the chain only know the result m+n mod d of the measurement performed by the receiver $C_n$.

Thus, the application of conjugate encoding through the use of incompatible encoding bases enables a secure transmission of a quantum state, or quantum information, between two first and second participants $C_i$ and $C_j$, wherein the transmitted quantum state is unknown to the other participants of the communication chain.

More generally, it is possible to consider that the transmission of quantum states by the first participant $C_i$ to the second participant $C_j$ is repeated to transmit a plurality of messages. In this case, $C_i$ can send a posteriori to $C_j$ the decisions he has taken at the different repeated second steps, and $C_j$ can select the information derived from measurements for which he has taken correct decisions during the different repeated third steps G3.

More theoretically, behind the use of conjugate encoding hides the use of the uncertainty principle of quantum physics. The use of conjugate bases has the effect that reading in one base a piece of information encoded in another base gives a completely random value. This is a maximum incompatibility, because we talk about incompatibility as soon as there is uncertainty about the sent value.

In the two other configurations that do not enable a quantum state transmission providing relevant information, i.e., as explained hereinabove, in the case where the participant $C_i$ decides to apply the transformation P during the sub-step $G_2$, and the participant $C_j$ decides not to apply the transformation $P^{(-1)}$ during the sub-step $G_3$, or conversely, in the case where the participant $C_i$ decides not to apply the transformation P during the sub-step $G_2$, and the participant $C_j$ decides to apply the transformation $P^{(-1)}$ during sub-step $G_3$, the result of the measurement announced by the receiver $C_N$ will be random and withdrawn and discarded.

According to an embodiment of the method for securely transmitting a sequence of quantum states, the dimension d of the Hilbert vector space for encoding the state vectors is equal to 2.

According to an embodiment of the invention, countermeasure mechanisms could be implemented in order to prevent third parties from being able to learn the modulations performed by the intermediate participants and thus learn the exchanged secret information.

In particular, a possible attack consists in injecting light with a given characteristic (wavelength, polarisation, and time) and measuring it after passage through an intermediate participant in order to learn its modulation characteristics.

In order to avoid this attack, filters could be implemented. To the extent that the modulators already have polarisation filtering characteristics, it is possible to simply add a frequency filter, in order to let only light pass at a predetermined frequency, and a time gate in order to let only photons pass at predetermined times (corresponding to transmissions by the emitter $C_1$).

This strategy works by imposing constraints on the optical signals transmitted by the emitter $C_1$.

The frequency filter could be implemented, for example, by means of a Fabry-Perot etalon, and the time gate could be an electro-optical intensity modulator, for example similar to that set up by the emitter $C_1$.

Henceforth, the only possible attacks would consist in injecting a light with the same characteristics as those provided for by the system. This is only possible by using a beam splitter.

The use of a beam splitter would inevitably lead to a decrease in optical power. Furthermore, a splitter does not allow recovering the light injected by the adversary because it cannot be distinguished from the "legitimate" beam transmitted by the emitter. This decrease and this disturbance of the optical flux can be detected, for example, by the mechanism described below.

Another embodiment of the first case of secure transmission, where the first and second participants $C_i$ and $C_j$ are participants different from the participants $C_1$ and $C_N$, i.e. they are neither emitter nor receiver, but simply transformers and the communication chain comprises a number N of participants greater than or equal to 4, will be described, where the second and fourth steps $G_2$ and $G_4$ could be followed by complementary steps aimed at preventing side-channel attacks of spies on the transmission of quantum states.

During the q-th repetition of the succession of steps of the method for securely transmitting a sequence of Q quantum states $q_q$, step $G_2$ could be followed by the following successive steps:

during a fifth step $G_5$, a portion $P_{seq1}$ of the light power originating from the participant $C_{i-1}$ could be sampled;

during a sixth step $G_6$, the portion $P_{seq1}$ could be compared with a portion $P_{seq1'}$ of the light power $P_{seq}$ of the sequence of photons sent by the emitter $C_1$, in order to detect a potential injection of spy photons between the participant $C_{i-1}$ and the first participant $C_i$. Step $G_4$ could also be followed by the following successive steps:

during a seventh step $G_7$, a portion $P_{seq2}$ of the light power originating from the participant $C_{j-1}$ could be sampled;

during an eighth step $G_8$, the portion $P_{seq2}$ could be compared with a portion $P_{seq2'}$ of the light power $P_{seq}-P_{seq1}$, in order to detect a potential injection of spy photons between the participant $C_{j-1}$ and the second participant $C_j$.

Indeed, it may be considered that, since the first and second participants $C_i$ and $C_j$ are transformers which cannot measure light power, a spy applies the following attack: in the case of quantum bits encoded in the photon phase, the spy could inject between the emitter $C_1$ and the participant $C_i$ polarisation photons different from those emitted by the emitter $C_1$, which is a legitimate participant. FIG. 4 shows an embodiment of this side-channel attack on a first participant $C_i$ by a spy in an optical quantum communication device. The spy just needs to combine his spy photons with the photons emitted legitimately by the emitter $C_1$, by using for example a polarisation combiner, and to recover just after the participant $C_i$ the spy photons that he would have introduced. Thus, the spy could measure the modulation applied by the first participant $C_i$, and learn for example the values of $s_q$ and m chosen by the first participant $C_i$. The same attack by spy photon injection upstream of the second participant $C_j$ and recovery of photons modulated by the second participant $C_j$ just after the second participant $C_j$ could be applied. A necessary condition for carrying out this type of attack is for the spy to be able to position himself just before and just after a participant. Thus, this type of attack is not possible on the emitter $C_1$ and receiver $C_N$ participants. FIG. 4 schematically illustrates the principle of side-channel attack as described before.

The light power samples sampled during the fifth and seventh steps $G_5$ and $G_7$ enable the measurement thereof as well as the verification of the conformity of these measurements, by the comparisons performed during the sixth and eighth steps $G_6$ and $G_8$, with the light power $P_{seq}$ sent by the emitter $C_1$. These samples and comparisons thus form countermeasures performed respectively by the first participant $C_i$ and the second participant $C_j$. FIG. 5 schematically illustrates the principle of countermeasure that could be performed by one of the first or second participants $C_i$ or $C_j$ during the sixth and eighth stages $G_6$ or $G_8$.

Hence, the fifth, sixth, seventh and eighth steps $G_5$ to $G_8$ form additional security of the method for transmitting a sequence of quantum states between the first and second participants $C_i$ and $C_j$ because they allow detecting possible side-channel attacks by spies. This additional security could be implemented with simple and inexpensive hardware.

In this embodiment, the uncertainty principle also ensures security. Suppose that a spy measures the photons of the first participant $C_i$ and re-emits a photon identical to that one he has measured. If he has measured in an encoding base different from that one chosen by the first participant $C_i$, which happens half the time, then the spy will modify the photon, because of the equiprobability on the measurement results that he might get. The statistics will be modified accordingly in a visible way for the first participant $C_i$ and the second participant $C_j$. By comparing a small portion of the received photons with those that have been sent, the first and second participants $C_i$ and $C_j$ can thus spot a spy who is listening to their conversation.

Thus, this additional security mechanism can operate independently of the frequency filter and the time gate described hereinabove, but it also allows for a synergetic effect since each of these two mechanisms targets complementary attacks and their joint use thus allows blocking a wide variety of possible attacks.

According to one embodiment, these two additional mechanisms are implemented jointly.

Preferably, the degree of freedom of the photons encoding the quantum bits is selected amongst the phase, the phase difference, the temporal location, the polarisation or the frequency of the photon.

Advantageously, the sequence of Q quantum states $q_q$ for q integer comprised between 1 and q is chosen randomly in order to establish a quantum key distributed between the participants Ci and Cj. In this particular case, the step of exchanging the transformation decisions of steps $G_2$ and $G_3$ corresponding to the "key sifting" operation performed in a standard manner in a quantum key distribution protocol.

The implementation of the method for securely transmitting a sequence of Q quantum states $q_q$, q being an integer comprised between 1 and Q could be carried out using a device comprising:

a laser adapted to generate photons and an initial modulator adapted to modulate a degree of freedom of a generated photon, said laser and said initial modulator being associated to the emitter $C_1$ N−2 intermediate modulators adapted to modulate a degree of freedom of a received photon, each of the N−2 intermediate modulators being associated to an intermediate participant $C_k$, amongst the N−2 intermediate participants $C_2$ to $C_{N-1}$ other than the emitter $C_1$ and the receiver $C_N$ a photon detector adapted to detect unique photons and a final modulator adapted to modulate a degree of freedom of a received photon; said photon detector and said final modulator being associated to the receiver $C_N$ FIG. 6 illustrates an embodiment of this device for a communication chain with four participants.

The previously-described device could be used in the following manner. Once the first and second participants $C_i$ and $C_j$ have been chosen, a laser associated to the emitter $C_1$ generates, following a command from the emitter $C_1$, a flux of photons encoding a sequence of quantum bits. The flux of photons is transmitted in the communication chain through the initial modulator, the N–2 intermediate modulators, the final modulator, and up to the photon detector.

In the context of the transmission of a sequence of Q quantum states encoded on Q photons, for each photon:
  during the transmission of said photon through the communication chain, the first participant $C_i$ performs a first action on said photon, comprising a first decision step $G_1$ and a second decision step $G_2$, by controlling a modulator associated thereto, i.e. either the initial modulator, or one of the N–2 modulators,
  following the first action of the first participant $C_i$ on said photon, the transmission of the photon is carried on up to the second participant $C_j$, who performs on the photon, after reception thereof, a second action, comprising a third decision step $G_3$ and a fourth decision step $G_4$, by controlling a modulator associated thereto, i.e. either one of the N–2 intermediate modulators, or the final modulator. Following the second action of the second participant $C_j$ on the photon, the transmission of said photon is carried on until reception thereof by the photon detector associated to the receiver $C_N$,
  the receiver $C_N$ measures the final state of the quantum bit encoded in the photon it receives and shares the result of the measurement with the other participants in the communication chain,
  the first and second participants $C_i$ and $C_j$ exchange on a conventional communication channel the decisions taken during the second and third steps $G_2$ and $G_3$,
  the first and second participants $C_i$ and $C_j$ deduce a description of the quantum state using the exchanged decisions and the measurement by the receiver $C_N$ of the final state of the quantum bit encoded in the photon detected by the photon detector associated to the receiver $C_N$.

Thus, the first participant $C_i$ and the second participant $C_j$ reconstitute, by concatenation, a sequence of the descriptions of the Q transmitted quantum states, discarding, where necessary, the irrelevant and non-exploitable descriptions, in the previously-described cases.

Hence, the advantage of the method for transmitting sequences of quantum states between several participants presented in this application consists in that it could be implemented by a device comprising only one laser and only one photon detector. These last components being in general the most expensive hardware elements, the protocol presented herein therefore allows carrying out a transmission of sequences of quantum states with a lower cost per participant.

In the previously-described case where the first and second participants $C_i$ and $C_j$ are participants other than the participants $C_1$ and $C_N$, the above-described device could be supplemented by:
  a first beam splitter $S_i$ positioned upstream of the modulator associated to the first participant $C_i$,
  a first photodiode $PD_i$ associated to the first participant $C_i$ and adapted to measure a light power,
  a second beam splitter $S_j$ positioned upstream of the modulator associated to the second participant $C_j$,
  a second photodiode $PD_j$ associated to the second participant $C_j$ and adapted to measure a light power.

The beam splitter $S_i$ separates the flow of photons received from the participant $C_{i-1}$ in two distinct directions, one towards the modulator of the first participant $C_i$ then towards the rest of the communication chain, the other one towards the photodiode $PD_i$. The second beam splitter $S_j$ separates the flux of photons received from the participant $C_{j-1}$ in two distinct directions, one in the direction of the modulator of the second participant $C_j$ then towards the rest of the communication chain, the other one towards the second photodiode $PD_j$.

These additional components enable the implementation of the securing of the method for transmission of sequences of quantum states against side-channel attacks. In particular, they enable the completion of the fifth, sixth, seventh and eighth steps $G_5$ to $G_8$ described before. The fifth and seventh steps $G_5$ and $G_7$ are carried out respectively by measuring the light power $P_{seq1}$ by the photodiode $PD_i$ and by measuring the light power $P_{seq2}$. The sixth and eighth comparison steps $G_6$ and $G_8$ are carried out using the measurements of the light powers $P_{seq1}$ and $P_{seq2}$ and the light power prediction values $P_{seq1'}$ and $P_{seq2'}$. For example, when one of the comparisons, between $P_{seq1}$ and $P_{seq1'}$ on the one hand, and between $P_{seq2}$ and $P_{seq2'}$ on the other hand, results in an inequality, an attack by a spy, for example by injection of photons, can be detected.

In this configuration, the first and second beam splitters $S_i$ and $S_j$ are configured so that with a probability p, the photons crossing them are directed towards the first and second photodiodes $PD_i$ and $PD_j$ respectively. The photodiodes $PD_i$ and $PD_j$ can measure the average light power over a given period of time.

Thus, these additional components are also much simpler and less expensive in comparison with hardware conventionally used in quantum communication devices such as for example single photon detectors.

When the degree of freedom of the photons to encode the quantum bits is the phase, the initial modulator, the N–2 intermediate modulators and the modulator could be phase modulators. For example, the LN53S-FC or LN65S-FC model marketed by the company Thorlabs could be used.

When the degree of freedom of the photons to encode the quantum bits is the polarisation of the photons, the initial modulator, the N–2 intermediate modulators and the modulator could be polarisation modulators. For example, a model of the PSC-LN series products marketed by the company iXblue Photonics could be used.

When the degree of freedom of the photons to encode the quantum bits is the temporal location of the photons, the initial modulator, the N–2 intermediate modulators and the modulator may each comprises a number d of delay lines and a number 2d of splitter plates, where d represents the dimension of the Hilbert vector space of representation of the quantum states. The superimposition of temporal locations to be carried out to create an incompatible base could be obtained by programming the splitter plates. FIG. 7 illustrates a temporal location modulator device, in the case where d is equal to 2.

FIG. 8 shows an example of a couple of incompatible bases designed in the case where the degree of freedom of the photons is the location for a 4-dimensional Hilbert vector space. The four temporal locations corresponding to the states of the base $|t_0\rangle$, $|t_1\rangle$, $|t_2\rangle$ and $|t_3\rangle$ are $t_0$, $t_1$ equal to $t_0+\tau$, $t_2$ equal to $t_0+2\tau$ and $t_3$ equal to $t_0+3\tau$. An example of an incompatible base could then be the base $|\tau_0\rangle$, $|\tau_1\rangle$, $|\tau_2\rangle$ and $|\tau_3\rangle$ as represented in FIG. 8. A use of these two bases is found in the article "*Provably secure and high-rate quantum key distribution with time-bin qubits*" (Islam et al., Sci. Adv. 2017; 3).

Post-processing such as error correction or standard privacy amplification in quantum key distribution protocols could also be applied following the implementation of the different embodiments of the method for securely transmitting sequences of quantum states.

According to some embodiments, the invention may have several advantages:

- the method for transmitting quantum states could be doubly secure, on the one hand intrinsically by applying the principle of conjugate encoding, on the other hand extrinsically by the countermeasure implemented to detect side-channel attacks;
- the hardware used for the implementation of the presented transmission method is simple and inexpensive because it requires only two expensive components, a laser and a unique photon detector, as well as other much more accessible components, modulators, delay lines, beam splitters, conventional photodiodes.

According to embodiments of the invention, it is possible to connect different devices, in order to form transmission networks on a larger scale.

Thus, each device as previously described could allow covering a geographical area with a moderate size, corresponding for example to an urban or metropolitan area (of the MAN type, standing for "Metropolitan Area Network"). These networks could be connected together on a national or international scale at interconnection points whose functions are to transmit keys from one network to another. These network interconnections could for example be done through satellite networks, allowing interconnecting the metropolitan networks.

The invention claimed is:

1. A method for securely transmitting a sequence of Q quantum states $q_q$ encoded in the form of a sequence of Q photons, q being an integer comprised between 1 and Q, between a first participant ($C_i$) and a second participant ($C_j$), selected amongst a plurality of N distinct participants ($C_1$), . . . ($C_i$), . . . ($C_j$), . . . (CN) of the same quantum communication channel forming a communication chain between an emitter ($C_1$) and a receiver ($C_N$), where N is an integer greater than or equal to 3, wherein the first participant ($C_i$) is located upstream of the second participant ($C_j$) in the communication chain and wherein the first participant ($C_i$) is different from the emitter ($C_1$) and/or the second participant ($C_j$) is different from the receiver ($C_N$), said method comprising, in order:

the succession of the following steps, repeated from q=1 to Q:

a first action performed by the emitter ($C_1$) comprising the preparation by the emitter ($C_1$) of a photon in a start quantum state $|u\rangle$ of an orthonormal encoding base Ba with a dimension d and of base states $|e0\rangle$, $|e1\rangle$, . . . $|ed-1\rangle$, with a randomly chosen between 0 and 1, transmission of the prepared photon in the communication chain, a second action performed by the first participant ($C_i$) on said photon, of decision of transformation or not of the quantum state of the transmitted photon, in an orthogonal base quantum state in the encoding base $B_0$ and in the encoding base $B_1$ a third action performed by the second participant ($C_j$) on said photon, of decision of transformation or not of the quantum state of the photon received from the immediately preceding participant ($C_{j-1}$) into a corresponding orthogonal quantum state in the encoding base $B_0$ and in the encoding base $B_1$ a fourth action performed by the receiver ($C_N$) comprising the measurement, in the standard base $B_0$ or in the base $B_1$, of the final state $|alpha_{final}\rangle$ of the photon transmitted in the communication chain by the receiver ($C_N$), exchanges on a conventional communication channel between at least part of the participants, at least part of the decisions among those of the start base a, of the start state $|u\rangle$, of the measurement base chosen by said receiver ($C_N$) and the result of the measurement of $|alpha_{final}\rangle$ in this measurement base, obtaining, between the first and second participants ($C_i$) and ($C_j$), a description of the transmitted quantum state $q_q$ corresponding to one of the base states $|e_0\rangle$, $|e_1\rangle$, . . . $|e_{d-1}\rangle$, thanks to said part of the decisions and said result of the measurement;

then, the reconstitution, by the first and second participants ($C_i$) and ($C_j$), by concatenation, of a sequence of the descriptions of the transmitted Q quantum states $q_q$, for q ranging from 1 to Q.

2. The method according to claim 1, wherein, for each repetition from q=1 to Q of the succession of steps:

The first action, performed by the emitter ($C_1$), comprises the following steps:

Choose a value sq equal to 0 or 1

Choose a value I comprised between 0 and d−1

Apply a transformation $P^{sq}X_I$ to a reference photon created by the emitter at the start of the communication chain the second action, performed by the first participant ($C_i$), comprises the following steps:

Choose a value m comprised between 0 and d−1

Apply a transformation Xm to the photon received through the communication chain, the third action, performed by the second participant ($C_j$), comprises the following steps:

Choose a value n comprised between 0 and d−1

Apply a transformation Xn to the photon received through the communication chain, the fourth action, performed by the receiver ($C_N$), comprises the following steps:

Choose a value tq equal to 0 or 1

Apply a transformation $P^{(-1)tq}$ to the photon received through the communication chain, wherein:

the notation $P^1$ means that the transformation P takes place, the notation $P^0$ means that the transformation P does not take place, the notation $P^{(-1)1}$ means that the transformation $P^{(-1)}$ takes place, the notation $P^{(-1)0}$ means that the transformation $P^{(-1)}$ does not take place, the notation Xm refers to a transformation allowing switching from the base quantum state $|t\rangle$, t being an integer comprised between 0 and d−1, into the orthogonal state $c|(t+m) \bmod d\rangle$ in the base $B_0$ or the transformation allowing switching from a state $|e_t\rangle$ into $d|e_{t+m \bmod d}\rangle$ in the base $B_1$, for m an integer comprised between 0 and d−1, and c and d global phases induced by these transformations.

3. The secure transmission method according to claim 1, wherein, for each repetition from q=1 to Q of the succession of steps:

the first action comprises the preparation by the emitter ($C_1$) of a photon in a quantum state with a reference base $|0\rangle$ of an orthonormal encoding base $B_0$, called standard base with a dimension d, the second action performed by the first participant ($C_i$), comprises the following steps:

Choose a value sq equal to 0 or 1

Choose a value m comprised between 0 and d−1

Apply a transformation $P^{sq}X_m$ to the photon received through the communication chain, or in the case where i is equal to 1, to the photon at the start of the communication chain, the third action, performed by the second participant ($C_j$), includes the following steps:

Choose a value tq equal to 0 or 1

Choose a value n between 0 and d−1

Apply a transformation $X_n P^{(-1)tq}$ to the photon received through the communication chain, wherein:

the notation $P^1$ means that the transformation P takes place, the notation $P^0$ means that the transformation P does not take place, the notation $P^{(-1)1}$ means that the transformation $P^{(-1)}$ takes place, the notation $P^{(-1)0}$ means that the transformation $P^{(-1)}$ does not take place, the notation $X_m$ refers to a transformation allowing switching from the base quantum state $|t\rangle$, t being an integer comprised between 0 and d−1, into the orthogonal state $|(t+m) \bmod d\rangle$ in the base $B_0$ or the transformation allowing switching from a state $|e_t\rangle$ to $|e_{t+m} \bmod d\rangle$ in the base $B_1$, for m an integer comprised between 0 and d−1.

4. The secure transmission method according to claim 1, wherein said dimension d is equal to 2.

5. The method according to claim 1, wherein said photon is transmitted through a frequency filter and a time gate.

6. The secure transmission method according to claim 1, wherein i is different from 1 and N, and j is different from 1 and N, the sequence of Q photons encoding the sequence of Q quantum states $q_q$ has a given light power $P_{seq}$ and N is an integer greater than or equal to 4, and wherein:

Said second action comprises:

a step ($G_5$) of sampling a first portion ($P_{seq1}$) of the light power ($P_{seq}$) of the flux of photons received from the participant ($C_{i-1}$) immediately preceding the first participant ($C_i$), a step ($G_6$) of comparing the first portion ($P_{seq1}$) with a second portion ($P_{seq1}'$) of the light power ($P_{seq}$) of the flux of photons sent by the emitter ($C_1$) in order to detect a potential injection of spy photons before the first participant ($C_i$), said third action comprises:

a step ($G_7$) of sampling a third portion ($P_{seq2}$) of the light power of the flux of photons received from the participant ($C_{j-1}$) immediately preceding the second participant ($C_j$), a step ($G_8$) of comparing the third portion ($P_{seq2}$) with a fourth portion ($P_{seq2}'$) of the difference between the light power of the flux of photons sent by the emitter ($P_{seq}$) and the first portion ($P_{seq1}$) in order to detect a potential injection of spy photons before the second participant ($C_j$).

7. The secure transmission method according to claim 1, wherein each quantum state $q_q$ is encoded in a degree of freedom of the photon selected amongst the phase, the phase difference, the temporal location, the polarisation or the frequency of the photon.

8. The secure transmission method according to claim 1, wherein the sequence of Q quantum states $q_q$ is randomly chosen in order to establish a quantum key.

9. A device for implementing the secure transmission method according to claim 1, comprising:

a laser adapted to generate photons and an initial modulator adapted to modulate a degree of freedom of a generated photon, N−2 intermediate modulators adapted to modulate a degree of freedom of a received photon, a photon detector adapted to detect unique photons and a final modulator adapted to modulate a degree of freedom of a received photon, wherein:

the laser and the initial modulator are associated to the emitter ($C_1$) and are adapted to of be controlled by the emitter ($C_1$), each of the N−2 intermediate modulators is associated to an intermediate participant ($C_k$) among the N−2 intermediate participants ($C_2$) to ($C_{N-1}$) other than the emitter ($C_1$) and the receiver ($C_N$) and is adapted to be controlled by said intermediate participant ($C_k$), the photon detector and the final modulator are associated to the receiver ($C_N$) and are adapted to be controlled by the receiver ($C_N$).

10. The device according to claim 9 for implementing a secure transmission method further comprising, in the case where the first participant ($C_i$) and the second participant ($C_j$) are both distinct from the emitter ($C_1$) and the receiver ($C_N$):

a first beam splitter ($S_i$) positioned upstream of the modulator associated to the first participant ($C_i$), a first photodiode ($PD_i$) associated to the first participant ($C_i$) and adapted to measure a light power of a flux of photons, a second beam splitter ($S_j$) positioned upstream of the modulator associated to the second participant ($C_j$), a second photodiode ($PD_j$) associated to the second participant ($C_j$) and adapted to measure a light power of a flux of photons, wherein:

the first beam splitter ($S_i$) is adapted to separate a flux of photons received from the participant immediately preceding the first participant in the communication chain ($C_{i-1}$) in two distinct directions, one towards the modulator of the first participant ($C_i$) then towards the rest of the communication chain, the other towards the first photodiode ($PD_i$), the second beam splitter ($S_j$) is adapted to separate a flux of photons received from the participant immediately preceding the second participant in the communication chain ($C_{j-1}$) in two distinct directions, one towards the modulator of the second participant ($C_j$) then towards the rest of the communication chain, the other towards the second photodiode ($PD_j$), in order to implement the secure transmission method.

11. The device for implementing a secure transmission method according to claim 9, wherein:

The degree of freedom of the chosen photon is the phase

The initial modulator, the intermediate modulators and the final modulator are phase modulators.

12. The device for implementing the secure transmission method according to claim 9, wherein:
- The degree of freedom of the chosen photon is the polarisation
- The initial modulator, the intermediate modulators and the final modulator are polarisation modulators.

13. The device for implementing a secure transmission method according to claim 9, wherein:
- The degree of freedom of the chosen photon is the temporal location
- Each of the initial modulator, the intermediate modulators and the final modulator comprises a number of delay lines equal to the dimension of the encoding base of the quantum bits and a number of splitter plates equal to twice the number of delay lines.

* * * * *

UNITED STATES PATENT AND TRADEMARK OFFICE
CERTIFICATE OF CORRECTION

| | | |
|---|---|---|
| PATENT NO. | : 12,225,118 B2 | Page 1 of 2 |
| APPLICATION NO. | : 17/640763 | |
| DATED | : February 11, 2025 | |
| INVENTOR(S) | : Marc Kaplan and George Harder | |

It is certified that error appears in the above-identified patent and that said Letters Patent is hereby corrected as shown below:

In the Claims

Column 19, Claim 1, Line 45, cancel the text:
"$(C_1), \ldots (C_i), \ldots (C_j), \ldots (CN)$ of the same quantum"
Please insert the following:
--$(C_1), \ldots (C_i), \ldots (C_j), \ldots (C_N)$ of the same quantum--

Column 19, Claim 1, Line 52, cancel the text:
"participant $(C_i)$ is different from the receiver $(C_N)$, said"
Please insert the following:
--participant $(C_{j)}$ is different from the receiver $(C_N)$, said--

Column 20, Claim 2, Line 61, cancel the text:
"switching from the base quantum state $|t^>$, t being an"
Please insert the following:
--switching from the base quantum state $|t>$, t being an--

Column 21, Claim 3, Line 34, cancel the text:
"nal state $|(t+m) \bmod d>$ in the base Boor the transfor-"
Please insert the following:
--nal state $|(t+m) \bmod d>$ in the base $B_0$ or the transfor- --

Column 21, Claim 3, Line 35, cancel the text:
"mation allowing switching from a state $|e_t>$ to $|e_t+m \bmod d>$ in the base $B_1$,"
Please insert the following:
--mation allowing switching from a state $|e_t>$ to $|e_{t+m \bmod d}>$ in the base $B_1$,--

Column 22, Claim 9, Line 22, cancel the text:
"emitter $(C_1)$ and are adapted to of be controlled by the"

Signed and Sealed this
Twenty-second Day of April, 2025

Coke Morgan Stewart
*Acting Director of the United States Patent and Trademark Office*

CERTIFICATE OF CORRECTION (continued)
U.S. Pat. No. 12,225,118 B2

Please insert the following:
--emitter ($C_1$) and are adapted to be controlled by the--